United States Patent [19]

Mommer et al.

[11] Patent Number: 4,631,192
[45] Date of Patent: Dec. 23, 1986

[54] CONTINUOUS-FLOW PROCESS FOR MAKING A HARDENED ANIMAL FEED COMPOSITION

[75] Inventors: Richard P. Mommer, Loveland; Johnny M. Thomas, II, Fort Collins, both of Colo.

[73] Assignee: Uniscope, Inc., Johnstown, Colo.

[21] Appl. No.: 683,857

[22] Filed: Dec. 20, 1984

Related U.S. Application Data

[63] Continuation-in-part of Ser. No. 204,627, Nov. 6, 1980, abandoned.

[51] Int. Cl.⁴ .................. A23K 1/22; A23N 17/00
[52] U.S. Cl. ..................... 426/69; 366/603; 426/519; 426/658; 426/807
[58] Field of Search ............ 426/658, 805, 807, 519, 426/630, 635, 285, 69, 74; 366/603; 222/129

[56] References Cited

U.S. PATENT DOCUMENTS

| | | | |
|---|---|---|---|
| 3,272,180 | 9/1966 | Schommer | 366/603 |
| 4,016,296 | 4/1977 | DeSantis | 426/630 |
| 4,027,043 | 5/1977 | Schroeder et al. | 426/658 |
| 4,160,041 | 7/1979 | Schroeder et al. | 426/658 |
| 4,234,608 | 11/1980 | Linehan | 426/72 |
| 4,491,420 | 1/1985 | Addison | 366/603 |

FOREIGN PATENT DOCUMENTS

1361266 7/1974 United Kingdom .

*Primary Examiner*—George Yeung
*Attorney, Agent, or Firm*—Lackenbach, Siegel Marzully, Presta & Aronson

[57] ABSTRACT

A hardened animal feed block is formed from dry ingredients including CaO and liquid ingredients including molasses in a continuous flow mixing system under exothermic conditions so as to be discharged at 80° F. to 170° F. and poured into a container for self-setting without compression forces. The calcium oxide need be present only in limited controlled amounts, and the ingredients and process do not require additional water. The finished block provides desired daily annual consumption of the block nutrients, medicaments, and vitamins.

15 Claims, 3 Drawing Figures

CONTINUOUS-FLOW PROCESS FOR MAKING A HARDENED ANIMAL FEED COMPOSITION

FIELD OF THE INVENTION

This invention relates to an animal feed block made of molasses and calcium oxide, and a continuous method of preparation. The molasses-calcium oxide animal feed block is of the type to be used as an animal feed supplement and can also include minerals, natural protein, non-protein nitrogen, salt, vitamins, and medicines.

BACKGROUND AND DISCUSSION OF THE PRIOR ART

Several approaches have been used by the prior art in the manufacture of solid animal feed blocks. One method commonly used is to form a molasses block using extremely high compression pressure, usually about 100 tons per square inch. A disadvantage of this method is that the maximum percentage of molasses in such feed blocks which can satisfactorily be incorporated under these conditions is only about 3-5 wt. %, due to the fact that any combinations with higher percentages of molasses produces a sticky, gooey mass. This high compression method also involves the use of very costly machinery. These blocks cannot currently be produced in the 250 or 500 lb. block sizes. Furthermore, they allow overconsumption and exhibit cracking, poor weather durability, and cannot use high levels of fat.

Batch mixing methods are utilized in the processing of all molasses feed blocks which are subsequently hardened chemically, and/or by means of heat, dehydration, vacuum, or other physical means. A batch mixing system entails the blending of solid ingredients with liquid ingredients together in a vessel or tank equipped with an agitator, and the resultant mixture dispersed or pumped into containers.

U.S. Pat. No. 3,961,081 to McKenzie discloses a batch mixing method which entails heating the body of the molasses feed composition to a temperature within the range of 225° to 300° F., and then subjecting the molasses composition to a vacuum to remove the final undesired moisture content. This was costly in terms of energy and equipment expenditures.

U.S. Pat. No. 4,061,728 to Graham et al. discloses a batch mixing process to form a therapeutic composition primarily used to control or prevent bloating in ruminant animals which is in the form of a substantially rigid block. The process comprises filling a reaction vessel fitted with a mixing device with molasses, heating said molasses to a temperature within the range of 65° to 75° C., adding magnesium oxide and a nonionic polyoxyalkylene surface active compound, and optionally adding water during said blending step. This process not only requires costly energy, but in addition suggests the use of water to aid in dispersion, similar to other block processes. The addition of water produces an animal feed block which is softer and less durable, increases its susceptability to mold and fungal contamination, and occupies valuable limited space in an energy and nutrient concentrated feed source. The amount of nonionic polyoxyalkylene surface active compound varies from about 5 to 25 wt. % of the starting material. The amount of magnesium oxide varies from about 5% w/w to 50% w/w based on the total weight of starting material.

U.S. Pat. No. 4,089,701 to Shimizu et al. relates to a batch mixing process for solidifying molasses by providing a mixture of molasses and a composition selected from oils, fats, and esters of higher fatty acids, and concentrating the mixture at a temperature between 100° and 175° C. under reduced pressure, in the presence of sufficient alkali to regulate the pH of the mixture to a value in the range of 8-12.

U.S. Pat. No. 4,027,043 to Schroeder et al. discloses an animal feed supplement in solid block form and a batch mixing process wherein the ingredients typically are heated and stirred to disperse the solid ingredients, maintained at a temperature of about 95° F. for a period of approximately 30 minutes, and consequently poured into molds and permitted to solidify. The amount of time required for completion of this process is not practical in terms of large scale, volume production, especially when compared to the continuous method of the present invention which requires only one to five minutes for the entire process. Another disadvantage to this batch mixing method is that the solid feed ingredients tend to reduce the pumpability of the sludge-like, resultant mixture; therefore many compositions which require high percentages of solids to be nutritionally adequate are impossible to produce. The components include a major proportion of molasses and solidifying components of a phosphate or phosphoric acid and a metal oxide or salt in sufficient quantities and proportions to solidify the product. The phosphate solidifying component can be any suitable feed grade water soluble phosphate or phosphoric acid including ammonium or alkali metal phosphates and various phosphoric acids. Orthophosphates or orthophosphoric acid are the preferred phosphate source and exist in the feed supplement at a concentration of about 0.5 to about 5% by weight, expressed as $P_2O_5$.

The other solidifying component of Schroeder et al.'s animal feed block composition is an oxide, salt, or mixture of a metal such as aluminum, calcium, or magnesium. These include calcium oxide, magnesium oxide, aluminum oxide, calcium sulphate, and the like. Of these, calcium oxide or calcium sulphate in the form of gypsum is most preferred and is present in amounts varying from about 0.5 to about 5 wt. %, expressed as the oxide.

Schroeder et al.'s proportions of the metal salt or oxide to the phosphate component are such that the animal feed product preferably has an acidic pH value, typically from 3 to about 6.5. The importance of the phosphate component as a solidifying agent is underscored by Schroeder et al.'s statement at column 3, lines 24-28 that "The solid blocks which are formed from the composition have a tendency to become *soft* as the equivalent weights ratio of the phosphate to the metal is reduced substantially below about 1.0"(Emphasis Added)

Schroeder et al. explains that the soluble phosphate and an added metal source, such as calcium oxide, function by at least partial reaction to form a metal phosphate.

Other components in Schroeder et al.'s animal feed block include edible fats and oils which can occupy 2 to about 30 wt. (weight) %. An emulsifying agent is also employed for stabilizing the composition and preventing the separation of the fat ingredient during manufacture and occupies from about 0.05 to about 1 wt. % of the feed block. When starch is used as an emulsifying agent, it can occupy 0.5 to about 6 wt. % of the solid feed block. Schroeder et al.'s animal feed block can also contain a non-protein nitrogen source, such as urea, biuret or mono- or di-ammonium phosphate, various trace nutrients, antibiotics and vitamins, and bloat inhibitors.

U.S. Pat. No. 4,062,988 to DeSantis relates to an animal feed block utilizing a batch mixing method to blend molasses, hard soap, and a natural protein source. The concentration of the molasses varies from about 25 to 75% by weight. The hard soap is formed in situ during preparation of the hard block by the reaction of a hard metallic soap former with a fatty acid soap former. The concentration of the hard soap in the feed block is generally from about 0.5 to about 10% by weight. A disadvantage of this process is that the calcium is present in the form of insoluble soaps which are not digestible.

Hard metallic soap formers are disclosed in DeSantis as including calcium oxide, sodium hydroxide, and mixtures thereof. The fatty acid soap formers include yellow grease, brown grease, acidulated soap stock, acidulated oils and fats. Yellow grease and brown grease are trade terms for reclaimed fats or grease which are acid or have been chemically treated to provide an acid constituency. The metallic soap former is generally employed in amounts varying from about 0.5 to about 5% by weight. The fatty acid soap former is generally used in amounts from 2 to about 20% by wt. The natural protein source can be derived from either plant sources or animal sources or mixtures. Examples of plant sources are cottonseed meal, soybean meal, peanut meal, and cell cream. Examples of animal sources are dried blood, meat and bone meal, and feather meal. The natural protein source has a minimum concentration of about 20% by wt. in order to obtain effective setting of the nutrient composition in block form.

U.S. Pat. No. 4,016,296 to DeSantis discloses an animal feed block processed in a batch mixing system, whereing molasses and a water absorbent clay are subjected to high speed shearing action, and the dispersion thereof is mixed with a water binding agent, hard soap, and one or more of the following: natural protein source, non-protein nitrogen source, phosphorous source, fatty acid, and fat. The molasses concentration varies from 25 to 75% by wt. Water absorbent clays include attapulgite clay, bentonite, kaolin, and mixtures thereof, and are present in the animal feed block in amounts varying from 0.5 to about 5% by wt. The water binding agents include calcium sulfate hemihydrate, calcium chloride and mixtures thereof in amounts varying from 0.2 to about 3% by wt. The hard soap is formed in situ by reaction of a hard metallic soap former with a fatty acid soap former in a manner similar to that of U.S. Pat. No. 4,062,988 to DeSantis. Phosphorous sources include monosodium phosphate, calcium superphosphate, ammonium phosphate and phosphoric acid, and are present in amounts providing 0.5 to about 7% by wt. of phosphorus. Various special purpose additives such as vitamins, minerals, magnesium compounds, alkaline compounds, preservatives, and antioxidants can also be included. Not only is the calcium present in the indigestible form of insoluble soap, but in addition high shear equipment is required for the process, which is energy and investment intensive.

Dehydrated blocks generally require batch mixing, and use a high percentage of molasses, and are limited to certain block types. The dehydrated blocks have high energy costs to produce, particularly in the removal of water, and poor product stability, thus allowing overconsumption.

Now there is provided in the present invention a continuous flow method for making a calcium oxide-molasses feed block in which no additional heat, water, compression, vacuum, or dehydration is required, wherein high ratios of solids to molasses may be used, to produce in minimal processing time, a self-setting, desirably hardened block. Hardening of said block depends solely on the controlled calcium oxide-molasses exothermic reaction, eliminating the need for solidifying agents such as soluble phosphates, water absorbent clays, or formation of insoluble soaps, and may contain high levels of nutrients, with medicaments and vitamins, to provide a desirable daily consumption rate.

SUMMARY OF THE INVENTION

A continuous flow method for producing a calcium oxide-molasses animal feed block wherein the dry, solid ingredients containing calcium oxide and the liquid ingredients containing molasses are comixed under exothermic conditions in an in-line mixer and discharged at 80° F. to 150° F. to a container to form a self-setting block of desirable hardness. The calcium oxide to molasses ratio is 1:1 to 1:22 by weight and the weight of dry solids may be 20% up to 70% by weight and include nutrients in high levels, as well as medicaments, wherein the daily consumption of same is at the desired level.

DETAILED DESCRIPTION OF THE INVENTION

In one aspect the present invention is a continuous flow method of forming an animal feed block by comixing dry, solid ingredients containing limited quantities of calcium oxide and liquid ingredients containing molasses in a continuous in-line mixer with a discharge outlet temperature of 80° F. to 150° F., and preferably 100° F. to 130° F., to be discharged into a container to form a self-setting block of desired hardness. This method does not require the addition of heat, pressure, water, drying, or other solidifying agents.

In another respect, the present invention is a hardened feed block produced according to the aforesaid method.

The calcium oxide to molasses ratio may be 1:1 to 1:22 by weight with ratios of 1:8 to 1:22 by weight preferred.

The solid ingredients may be present in amounts of 20% to 70% by weight, and preferably contain high percentages of animal nutrients.

The animal feed composition of the present invention is composed of a homgenous dispersion of calcium oxide and molasses, which can be allowed to harden without compressive forces to form a basic animal feed block. A wide variety of additional animal feed nutrients, additives, medicines, vitamins, minerals, and the like, can also be included as supplemental components in the molasses-calcium oxide dispersion. The supplemental components generally do not adversely affect the hardness of the feed block.

The present invention is an improvement over the prior art in that the hardening of the feed block depends on the control of the calcium oxide-molasses exothermic reaction. No other components are necessary to form a self-setting, hard, rigid block. The continuous method approach provides a wide flexibility and economy to an animal feed manufacturer, who can readily supplement the basic calcium oxide-molasses composition with other nutritional components depending upon customer needs and requirements for the end use of the feed block.

The intensity and extent of the exothermic reaction is controlled by the calcium oxide:molasses ratio; the type of continuous mixer, the mixer residence time; and the critical outlet or discharge temperature.

In general, the dry and liquid feed ingredients are volumetrically or gravimetrically metered into a continuous flow block mixer, which creates a homogenous mix of the formula. The formula becomes a thick, flowable mass that is dispensed into containers. The mixed ingredients in the containers are then allowed to solidify. Solidification begins immediately upon discharge from the block mixer. The blocks are firm in 1 to 2 hours, and ready for storage and/or shipping in 24 hours. A wide range of animal feed ingredients, minerals, by-products, and the like may be incorporated with the molasses and calcium oxide. As stated, the ratio of calcium oxide to molasses will generally vary from 1:1 to 1:22, and preferrably 1:8 to 1:22, respectively, by weight.

Table A summarizes the compositional ranges for the present invention.

Figure 1:
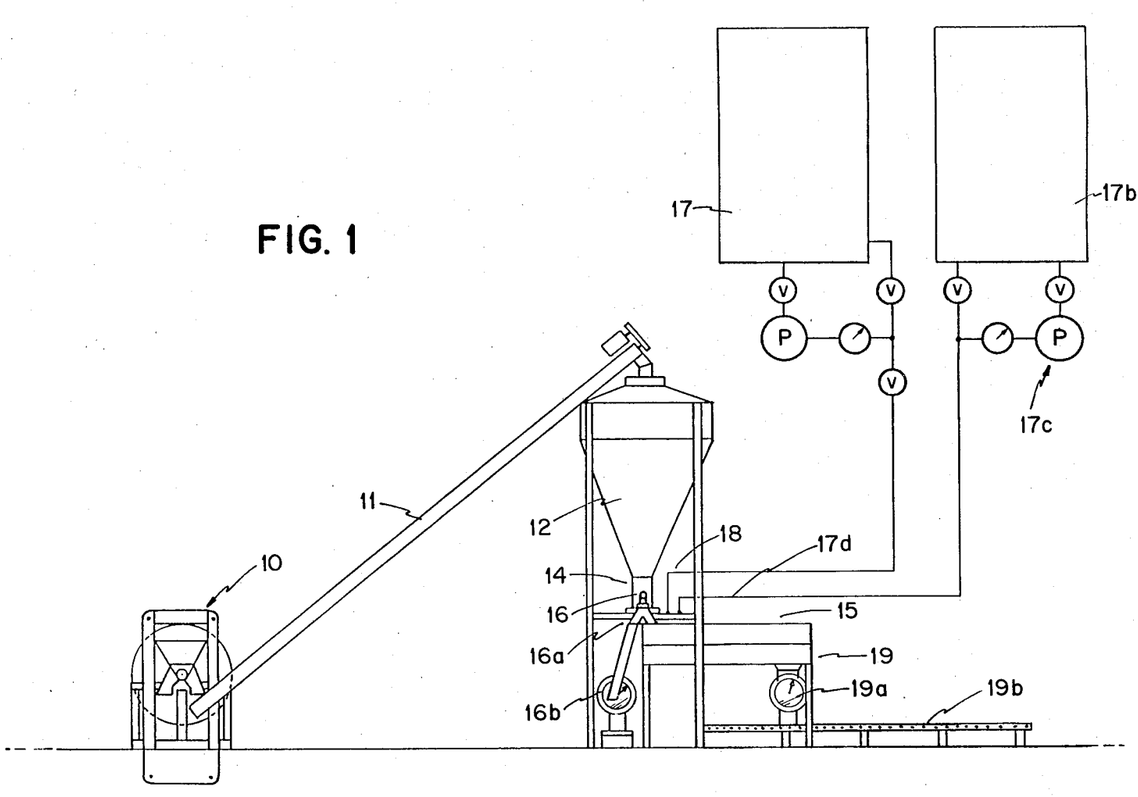
FIG. 1 is a side elevational, partial schematic view of one continuous process operation of the present invention.
Figure 2:
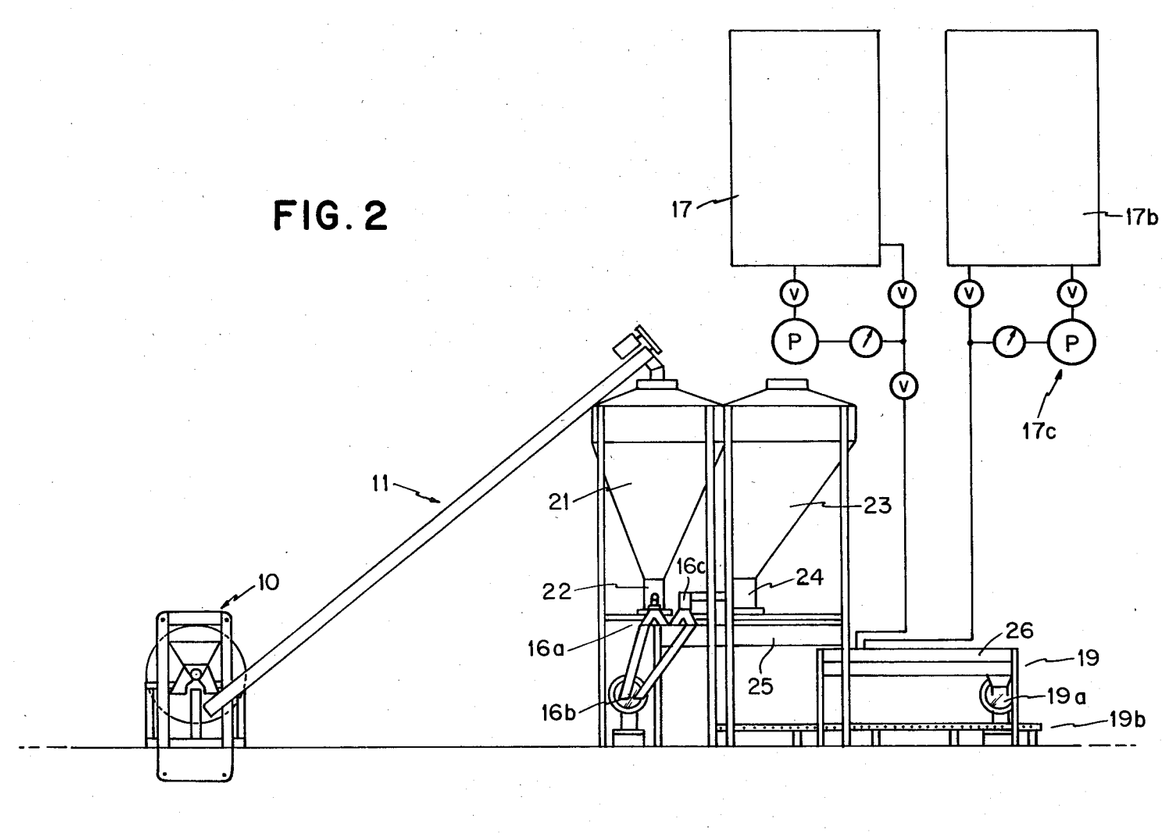
FIG. 2 is a side elevational, partial schematic view of a second continuous process operation of the present invention.
Figure 3:
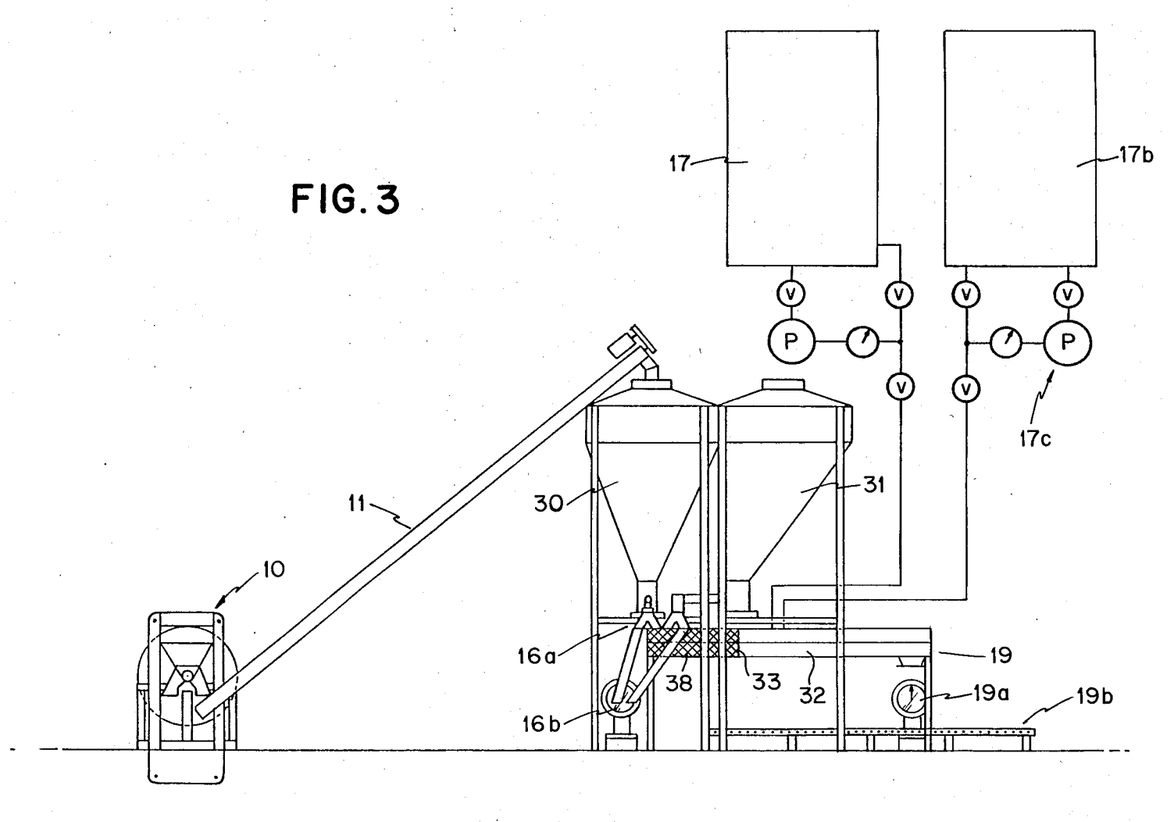
FIG. 3 is a side elevational, partial schematic view of a third continuous process operation of the present invention.

Three approaches or method variations as shown in FIGS. 1-3, respectively, can be utilized in the continuous mixing system. All three approaches provide for a production rate that may vary from 500 lbs. per hour to 20 tons per hour. A rate of 8 tons per hour of molasses and calcium oxide feed blocks is preferred, however. The discharge temperatures on all three approaches will vary substantially depending on the ratio of calcium oxide to molasses. The outlet discharge temperature is generated by an exothermic reaction between the molasses and calcium oxide, both at ambient temperature initially. In general, the block mixer discharge temperatures will vary from 80° to 150° F., with a preferred discharge temperature range of 100° to 130° F.

In the method of FIG. 1, the calcium oxide and dry ingredients are premixed in a ribbon, paddle, or drum mixer 10, or other conventional mixer. The premixed ingredients are then transferred by means of an auger, bucket conveyor 11, or other means into an overhead storage bin 12. Dry ingredients are gravimetrically or volumetrically metered at 14 by means of a bin discharge proportioning feeder into the block mixer 15.

TABLE A

| SUMMARY OF COMPOSITION RANGES | | |
|---|---|---|
| Ingredient | Range | Preferred Range |
| Trace Elements | 0.2 to 5% | 0.5 to 1% |
| Natural Protein | 0 to 50% | 10 to 30% |
| Salt | 0 to 60% | 3 to 20% |
| Magnesium Oxide | 0 to 60% | 2 to 25% |
| KMS (potassium-magnesium sulfate) | 0 to 20% | 0 to 10% |

TABLE A-continued

| SUMMARY OF COMPOSITION RANGES | | |
|---|---|---|
| Ingredient | Range | Preferred Range |
| Vitamins | 0.02% | 0.025 to 0.05% |
| Phosphates | 0 to 60% | 5 to 35% |
| Fats | 1 to 25% | — |
| Suspending Aids | 0 to 2.5% | 0.2 to 1.5% |
| Flavoring | 0 to 5% | 0.025 to 0.05 |
| Additional Liquids | 5 to 80% | 10% |
| Medicinals | (discussed hereinafter) | — |
| Solid Ingredients | 20 to 70% | |
| Molasses | 20 to 70% | |
| Cao:Molasses | 1:1 to 1:22 | 1:8 to 1:22 |

The metering feeder 16 adjusts the rate of flow of the dry ingredients into the block mixer 15, establishing a pre-determined production rate and the correct ratio of dry ingredients to the molasses. The metering feeder or proportioning device may be volumetric; however, a gravimetric weight feeder is preferred for calibration simplicity. See calibration gate 16a and 16b. The metering device should be capable of metering a wide variety of dry ingredients, preferably with less than 0.5% error. The percentage of weight of dry ingredients would range from 20% to 70% of the formula, with 50% by weight of the formula preferred.

Molasses is drawn from the bulk storage vessel 17 and proportioned volumetrically or gravimetrically into the block mixer inlet 18. The percentage by weight for the molasses will generally vary from about 20% to 70% of the total formula; however, a range of 30% to 60% by weight is preferred.

Additional liquid ingredients are stored in tank 17b and may be metered at 17c into the block mixer at 17d, such as liquid Vitamin E, corn distillers solubles, lignin sulfonate liquor, and the like. The additional liquid ingredients may be included in the formula from about 5% to 80% by weight; however, a preferred inclusion would be 10% by weight of the total. The additional liquid ingredients may be added to the block mixer 15 at any point on the mixer; i.e., before, after, or simultaneously with the molasses, depending on individual chemical characteristics, as long as adequate mixing is provided. It is preferred that additional liquids be added simultaneously along with the molasses to the block mixer.

The block mixing unit 15 consists of a continuous mixing device similar to a screw auger. The auger may be selected from a group consisting of single, double, or more continuous helicoidal augers; single, double, or more cut and fold design augers to increase turbulence and mixing, or single, double, or more continuous flow paddle mixer design. The preferred auger is a double paddle auger mixer design. The auger length will generally vary from 2 to 20 feet; however a 10 feet auger is preferred. Auger diameter may range from 3 inches to 4 inches, with a preferred diameter of 12 inches. The auger RPM may vary anywhere from 50 to 750 RPM, with the preferred auger RPM of 150. The molasses and calcium oxide blend will mix for approximately 2 to 4 minutes, preferably, before emptying out of the discharge gate. Block mixing retention time may range from 0.5 to 8 minutes. Surprisingly, the complete mixing time takes less than 10 minutes.

The discharge outlet 19 of the block mixer may consist of a preferred intermittent gate that momentarily halts the flow of block material to faclitate packaging, or a continuous flow discharge, to fill the mold with the molasses and calcium oxide mixture. See packaging scale 19a and finished block conveyor 19b.

The method of FIG. 2 is a process similar to that of FIG. 1, with two process alterations. First, whereas the dry ingredients in FIG. 1 are premixed with the calcium oxide prior to being metered into the block mixer, in FIG. 2 the dry ingredients are premixed without the calcium oxide. The premixed dry ingredients are then transferred to a holding bin 21 with an outlet proportioning feeder 22 and separate calibration gate 16a. The calcium oxide is stored in a separate holding bin 23, with an outlet proportioning feeder 24, and calibration gate 16c. The dry ingredient mix and the calcium oxide are then metered individually into a continuous dry blender 25, mixed thoroughly, and subsequently pass into the block mixer 26. The dry blender 25 is designed for thorough and continuous mixing of two or more ingredients. The unit may consist of a duo-helicoidal blending auger housed in a trough, a cut and fold auger, or any of the continuous mixing auger designs described as applicable for the block mixer. The preferred mixer is a cut and fold auger, with a preferred RPM of 150.

The method of FIG. 3 is a process similar to that of FIG. 2, with one process alteration. The dry ingredient blend holding bin 30, plus the separate calcium oxide holding bin 31, are located directly over the block mixer 32, instead of over the dry ingredient blender 38. The dry ingredient blend plus separately metered calcium oxide are metered directly into the block mixer 32 and mixed intimately prior to entering the section 33 of the block mixer where the molasses is introduced, and the liquid/dry mixing plase begins.

Table B summarizes the equipment parameter ranges in the present invention.

Molasses necessary in the present invention is derived as a by-product from the crystallization of cane or beet sugar, and is comprised mainly of invert sugar, sucrose, water, salts and other carbohydrates. Molasses contains various amounts of solids which affect its viscosity, and the amount of such solids is designated in terms of "degrees brix", which is a measure of the precent sugar.

TABLE B

| EQUIPMENT RANGES | | |
|---|---|---|
| Equipment | Range | Preferred Range |
| Outlet temperatures | 80° to 150° F. | 100° to 130° F. |
| Auger Length | 2 to 20 feet | 10 feet |
| Auger Diameter | 3 inches to 4 feet | 12 inches |
| Auger Type | Single, 2 or more - Helicoidal, cut/fold or paddle design | Double paddle |
| RPM | 50 to 750 | 150 |
| Time | 0.5 to 8 minutes | Less than 10 min. |

The molasses used in the present invention can be any sugar-containing molasses such as cane or black-strap molasses, beet molasses, converted molasses, wood sugar molasses, hydrosyrup, citrus molasses, and the like. Commercial molasses can vary with the range of 60°–90° brix, although feed molasses should be at least 79.5° brix for cane and beet molasses, and 71° brix for citrus molasses. Since cane or blackstrap molasses is most palatable for livestock, it is preferred.

The calcium oxide employed in the feed block is known also as lime, burnt lime, calx, quick lime, unslaked lime, finish lime, fat lime, mason's lime, and the like. The preferred form of calcium oxide conforms to ASTM Specification C5 and Federal Specification SSQ-351. The calcium oxide should preferably be in the form of a finely divided powder, and in a pure state so that it will readily combine wtih water to form a composition with a pasty consistency. A lean lime, i.e., one with a high percentage of impurities, will not slake freely with water or molasses and will not function as effectively as pure calcium oxide.

In certain circumstances an excessive heat build-up from the exothermic reaction between calcium oxide and molasses can be moderated by the substitution of calcium hydroxide, $Ca(OH)_2$, for at least a portion of the calcium oxide, but there is some loss in the hardness of the solidified composition. It has also been found that the complete substitution of $Ca(OH)_2$ for CaO, when mixed with molasses results in a dispersion that is substantially more viscous and does not flow as freely as the CaO-molasses dispersion.

A feed block containing a blend of calcium oxide and calcium hydroxide can be made. It has been found that substituting 2–4 parts by weight of calcium hydroxide for each part of calcium oxide removed, generally gives satisfactory results.

Surprisingly, it has been found that magnesium oxide cannot totally be substituted for calcium oxide as a hardener to make the basic animal feed block. It has been found that a molasses-magnesium oxide dispersion is not sufficiently reactive as a hardener, and will not solidify the block under the conditions the calcium oxide-molasses dispersion solidifies. However, the animal feed block can contain magnesium oxide as a supplemental nutritional additive, as is the case with a number of other optional ingredients.

In general, optional dry feed ingredients should not contribute more than 5 weight % to the final product. Some of these optional ingredients can include a suspension aid to prevent settling of insoluble additives until the feed composition solidifies. Examples of suspending aids are water soluble natural or synthetic polymers such as guar, locust bean gum, xanthan gum and the like. The amount of suspending aid can vary from 0–2.5%, preferably 0.2 to 1.5% by wt. of the total feed block product.

An insoluble phosphorous source can also be included, such as calcium phosphates, since they are the most economical. From a nutritional standpoint, a preferred phosphorous additive includes a mixture of approximately $\frac{2}{3}$ mono-calcium phosphate and $\frac{1}{3}$ dicalcium phosphate. A suitable additive of this type is BI-OFOS ™, available from International Minerals and Chemical Corporation, Libertyville, Ind., or DIKAL 21 ™, available from Borden Chemical Co. The feed block compositions can contain 0–60%, and preferably 5—35% by weight of these phosphorous sources.

Another recommended feed block component is potassium-magnesium sulfate, which occurs naturally as langbelinite, $(K_2SO_4 \cdot 2MgSO_4)$. It is available commercially under the trademark DYNAMATE from International Mineral and Chemical Corporation. The concentration of potassium-magnesium sulfate can vary from 0 to 20, preferably 0 to 10 weight % of the final feed block product. Potassium-magnesium sulfate is also referred to by those in the art as "KMS" and is used as a source of sulfur in ruminant blocks containing nonprotein nitrogen, usually in the form of urea. The recommended ratio is one part KMS for each 5 parts urea, to yield a sulfur-to-nitrogen ratio of 1-to-10.

A sodium source can also be included as a component of the feed block most economically in the form of sodium chloride, or common salt. Iodized salt can also be used, but non-iodized salt is more economical. Iodine, if desired can be included as part of a trace element premix. The salt can exist in the feed block in amounts varying from 0-60%, preferably 3-20% by weight of the product.

Sources of natural protein, such as soybean meal, cottonseed meal, blood meal, hydrolyzed feather meal, dried poultry waste and the like can be included. Urea is not a natural protein source, but rather a nitrogen source which ruminants metabolize into protein, and is preferred for economical reasons, although biuret and ammonium salts can also be used. The natural or metabolizable protein sources can vary from 0-50%, preferably from 10-30% by weight of the final feed block patent.

Certain elements in trace quantities can also be desirable as components in the feed block, and include silicon, vanadium, tin, nickel, molybdenum, and chromium.

The trace element package can vary from about 0.2% to 5%, preferably 0.5% to 1% by weight of the total feed block product.

An appropriate vitamin package can also be incorporated including such vitamins as A, B-complex, C, D, E, and K. The vitamin package can vary from 0.02%, preferably 0.025-0.05% by weight of the final feed block product.

Livestock edible animal and vegetable fats and oils, as well as chemical modifications therof, may also be incorporated as a component of the feed block for nutritional purposes. Most of the fats and oils are mixtures of glyceryl esters of stearic, palmitic, oleic, and other fatty acids. Sources could include tallow, fish oil, beef fat, cottonseed oil, soybean oil, acidulated soapstocks, and the like. The fat sources can vary from 1 to 25% by weight.

Medicinal additives can also be included in the feed block, for example, antibloat compounds,; antiparasitic drugs; anticoccidials; fly control agents; monensin sodium, which is a fermentation product produced by a strain of streptomyces cinnamonensis, which controls the environment of the rumen to favor certain types of microorganisms which produce essential metabolites to yield higher feed efficiency; antibiotics, and the like. The specific amount of these medicinal additives is subject to regulation by the Food and Drug Administration and is well known to those in the art.

The feed block of the present invention allows for free choice feeding by the animal. In free choice feeding, the palatability of the feed block will influence the amount of average daily consumption by the animal.

It has been found that the amount of calcium oxide in the feed block can influence its palatability and hardness. Thus, greater amounts of calcium oxide increases the alkalinity and hardness of the feed block, thereby tending to reduce consumption Other ingredients in the feed block can also influence palatability. Therefore, the formulation of a feed block composition must also take into consideration the rate at which the feed block will be consumed. This must be determined empirically. For example, with cattle or horses, a satisfactory 20% protein block consumption rate is about 1 to 3 pounds/head/day.

In the event higher consumption rates are desired, the palatability of the feed block can be improved by the introduction of natural and artificial flavoring agents therein. These food grade flavoring agents are well-known in the art and include methyl salicylate, sodium saccharin, anethole, coriander oil, fenugreek, and the like. The flavoring agents can vary from 0-5%, preferably from 0.025 to 0.05% by weight of the total feed block.

The following examples represent various embodiments of the invention. All parts and percentages are by weight, unless otherwise noted.

EXAMPLE 1a 85 grams of cane molasses at room temperature (approximately 68° F.) were placed in a beaker. 15 grams of finely divided calcium oxide were slowly added as the mixture was stirred continuously and vigorously with a stirring rod. The temperature of the mixture in the beaker increased to about 122° F. as it thickened. The thoroughly dispersed mixture was poured into an aluminum pie pan, about 9 inches in diameter and 1½ inches deep, and allowed to harden overnight. The next day the solidified block was placed on a flat surface. It was observed to have a consistency similar to asphalt and when a 170 pound wieght was placed on a 4 square inch area of the block, there were no observable signs of deformation.

EXAMPLE 1b

Example 1a was repeated except that calcium oxide was replaced by magnesium oxide. No increase in temperature was observed and the mixture remained in a liquid state after one week, with no signs of hardening.

EXAMPLES 2-9

Eight different solidified calcium oxide/molasses feed compositions were produced using the continuous flow mixing process according to FIG. 2. Finely divided calcium oxide was metered into the dry blending chamber, along with the separately metered promixed dry ingredients. The calcium oxide/dry ingredient mixture then entered a mixing chamber equipped with an 8 feet double screw paddle auger (3 inches diameter, 130 RPM). At this point the molasses was metered in from a holding tank, and all ingredients were intermixed as the dispersion traveled along the auger. Discharge outlet temperatures varied from about 80° F. to about 150° F. Production rates varied from 1 to 3 tons/hour. The feed mixture was discharged from the mixing chamber into containers 15 foot×14 foot×8 foot, and allowed to harden overnight. Each container formed a solid, 55 lb. feed block suitable for feeding cattle in feedlot or on pasture. Under various field tests conducted with local farmers, the average consumption was found to vary from 0.25 lbs. to 3.0 lbs./head/day. The components in the feed blocks of Examples 2 to 9 are tabulated in Table 1. Example 2 is a high energy feed block. Example 3 is a high protein content feed block with non-protein nitrogen suitable for cattle. Example 4 demonstrates a salt and trace mineral feed block composition. Example 5 is a high mineral content feed block suitable for year-round supplementary feeding for livestock. Example 6 is a high magnesium content feed block suitable for the prevention of grass tetany disease which normally occurs in the spring of the year when livestock graze lush, green pasture which is characteristically high in potassium and low in magnesium. Example 7 is a free choice salt and trace mineral combination block. Example 8 demonstrates a 20% natural protein feed block. Example 9 is a feed block high in calcium designed for calcium deficient grazing areas.

TABLE 1

| Ingredient | Example 2 | Example 3 | Example 4 | Example 5 | Example 6 | Example 7 | Example 8 | Example 9 |
|---|---|---|---|---|---|---|---|---|
| Cane Molasses | 10.0 | 44.44 | 32.0 | 41.51 | 41.51 | 70.27 | 50.0 | 44.0 |
| Calcium Oxide | 10.0 | 9.34 | 5.0 | 5.70 | 5.69 | 9.16 | 5.5 | 2.0 |
| Urea | — | 22.21 | — | — | — | — | — | — |
| BIOFOS TM * | — | 12.14 | 3.0 | 30.37 | 23.28 | — | 4.0 | — |
| Salt | — | 5.81 | 55.0 | 16.20 | 12.43 | 20.57 | — | — |
| DYNAMATE TM ** | — | 5.81 | — | — | — | — | — | — |
| Magnesium Oxide | — | — | — | 5.97 | 16.83 | — | 2.0 | — |
| Guar | — | 0.25 | — | 0.23 | 0.24 | — | — | — |
| Saccharin | — | — | — | 0.02 | 0.02 | — | — | — |
| Tallow | 2.0 | — | — | — | — | — | — | — |
| Liquid Whey | 42.0 | — | — | — | — | — | — | — |
| Soybean Meal | 36.0 | — | — | — | — | — | 26.5 | — |
| Tricalcium Phosphate | — | — | 4.0 | — | — | — | 4.0 | — |
| Trace Minerals | — | — | 1.0 | — | — | — | 0.5 | — |
| Blood Meal | — | — | — | — | — | — | 7.5 | — |
| Limestone | — | — | — | — | — | — | — | 54.0 |
| CALCIUM OXIDE: MOLASSES RATIO | 1:1 | 1:4.76 | 1:6.4 | 1:7.28 | 1:7.29 | 1:7.67 | 1:9.09 | 1:22 |

EXAMPLE 10

Using the continuous mixing approach, molasses was pumped at a rate of 260 pounds per hour into a horizontal mixing tube fitted with a shaft upon which were mounted several shearing blades. When the shaft operated at about 400–500 rpms or higher, the ingredients were whipped into a homogeneous dispersion. Calcium oxide was metered into the mixing tube at a rate of about 33.75 pounds per hour. The homogeneous dispersion was then collected in a rectangular receptacle (14 inches × 14 inches × 6 inches) and allowed to harden overnight. The solidified block was similar in hardness to the block formed in Example 1. However, it had a smoother and less grainy texture and appearance.

EXAMPLE 11

This experiment demonstrates that the following composition cannot be made in batch due to high solids, and also to demonstrate time saved in production by the continuous method. Two one-ton, identical animal feed block compositions were prepared. One ton was processed utilizing a batch mixing process, and the other was produced with a continuous flow process.

The composition consisted of:

|  | By Weight % |
|---|---|
| Cane Molasses | 50.00 |
| Wheat Middlings | 25.00 |
| Soybean Meal | 2.84 |
| Calcium Oxide | 5.50 |
| Monohydrogen Dicalcium Phosphate | 3.40 |
| Tricalcium Phosphate | 4.00 |
| Magnesium Oxide | 1.50 |
| Urea | 4.26 |

Utilizing the batch mixing method, the cane molasses was added at ambient temperature (about 68° F.) to a 130-gallon tank fitted with a central agitator, mixer, recirculation pump, and gravity discharge unit. The molasses was agitated and the premixed dry ingredients including calcium oxide were slowly added. The mixture was agitated for 15 minutes until homogeneous, and then gravitationally dispensed into containers. It attained a desirable mass temperature of 149° F. through the calcium oxide/molasses exothermic reaction. However, as the remaining 1,600 lbs. continued to mix and disperse, the exothermic reaction also continued, and the mass temperature rose to 170° F. At this point the mixture rapidly became thicker and difficult to discharge, and the final 200 lbs. was too thick to flow into containers. The filled containers were allowed to harden overnight. The blocks formed from the first 400 lbs. of mixture at 149° F. were acceptable, and showed in field trials a desirable animal consumption rate of 2 lbs./head/day. However, the blocks formed of the mixture with a mass temperature of 170° F. had continued to react in the containers post-dispensing, reaching temperatures of 240° F., and charred and boiled over in the containers. These blocks were not acceptable and were too hard for animal consumption. Total time for the processing of 1 ton via batch mixing method was 30 minutes.

Utilizing the continuous flow method, FIG. 1, of the present invention, animal feed blocks were manufactured with an identical composition. The dry, premixed ingredients including calcium oxide were calibrated and volumetrically metered into the system, as was the separately metered molasses at ambient temperature. The continuous flow system consisted of a double screw continuous paddle mixing auger (8 feet long, 6 inches diameter, operating at 150 RPM). The mixture flowed easily into the containers, and the blocks were allowed to harden overnight. All of the blocks formed with the continuous flow method were acceptable, and allowed for a desired daily animal consumption rate of 2 lbs./head/day. The block mixing retention time, or the mixing time from the entry of the dry premixed ingredients and the molasses to the point of block mixer outlet discharge, was 2.5 minutes. Total processing time for one ton, including mixing and dispensing, was 10 minutes.

EXAMPLE 12

A feed block is produced in accordance with the process of FIG. 1. A protein feed block formul was mixed in a conventional ribbon mixer and consisted of the formula:

| Ingredients | % By weight |
|---|---|
| Cane Molasses | 44.0 |
| Soybean Meal | 22.5 |
| Tricalcium Phosphate | 10.0 |
| Calcium Oxide | 5.5 |
| Hydrolyzed Feather Meal | 5.0 |
| Salt | 8.0 |
| Urea | 3.5 |

| Ingredients | % By weight |
|---|---|
| Calcined Magnesite | 1.5 |
| | 100.0 |

The premixed dry ingredients were then processed through a continuous flow block manufacturing system according to FIG. 1 with the following specifications:
Auger Type—Single screw continuous cut and fold
Auger Length—8 Feet
Auger Diameter—3 Inches
Auger RPM—130
Production Rate—600 lbs. per hour
Proportioning Units
  Molasses—Volumetric pump, calibrated at 4.4 lbs. per minute, ambient temperature
  Dry Ingredients/Calcium Oxide Premix—Volumetric proportioning Screw Feeder, calibrated at 5.6 lbs. per minute
Calcium Oxide:Molasses Ratio—1:8
Discharge Temp.—110° F.
Block Mixing Retention Time—2 minutes The resultant mixture was then dispensed via continuous flow discharge into 50 lb. containers.

EXAMPLE 13

A salt block formula was manufacture utilizing the continuous flow system of FIG. 2 with the formula:

| Ingredients | % By Weight |
|---|---|
| Cane Molasses | 30 |
| Corn Syrup | 5 |
| Calcium Oxide | 5 |
| Salt | 60 |
| | 100 |

Auger Type—Double screw continuous flow paddle mixer
Auger Length—8 Feet
Auger Diameter—10 Inches
Auger RPM—150
Production Rate—3 tons per Hour
Proportioning Units
  Corn Syrup—Gravimetric, located Entering block mixer simultaneously with molasses
  Molasses—Volumetric Pump, Ambient Temperature
  Calcium Oxide—Volumetric feeder
  Salt—Volumetric feeder
Calcium Oxide:Molasses Ratio—1:6
Block Mixer Discharge—120° F.
Retention Time—2.5 minutes.

The salt block formula was dispensed into 20 kg. containers, utilizing an automatic pinch type intermittent flow gate.

An example of the continuous flow system, according to FIG. 3 utilizes the following mineral block formula:

EXAMPLE 14

| Ingredients | % By Weight |
|---|---|
| Beet Molasses | 35.5 |
| Salt | 11.0 |
| Calcium Oxide | 3.0 |
| Calcined Magnesite | 6.0 |
| Tricalcium Phosphate | 44.5 |
| | 100.0 |

Auger Type—Double screw continuous flow paddle mixer
Auger Length—12 Feet (Longer auger length is utilized to facilitate dry ingredient mixing before molasses introduction)
Auger Diameter—12 Inches
Auger RPM—150
Production Time—5 minutes
Proportioning Units
  Molasses Pump, Ambient Temperature
  Dry Ingredient Blend—Gravimetric Feeder
  Calcium Oxide—Volumetric Feeder
Calcium Oxide:Molasses Ratio—1:11.83
Discharge Temperature—140° F.
Retention Time—5 minutes.

The mineral block formula was dispensed into 100 kg. molds using a continuous flow packaging system, whereas when the container being filled reached proper weight, it was pushed out from under the discharge outlet on a roller track, with an empty container following directly behind and under the discharge.

What is claimed is:

1. A continuous-flow process for making a hardened animal feed composition comprising the steps of:
   (a) continuously feeding solid ingredients comprising calcium oxide into a mixer;
   (b) continuously feeding liquid ingredients comprising molasses into a mixer, wherein the molasses weight is from equal to 22 times the calcium weight;
   (c) metering the solid and liquid ingredients from the mixers into a continuous-flow mixer, wherein the solid and liquid ingredients are mixed for a period of from about one-half to about ten minutes to produce a homogeneous animal feed composition; and
   (d) discharging the homogeneous animal feed composition from the continuous-flow mixer into a shaping device to form a hardened animal feed composition.

2. A process as in claim 1, wherein the homogeneous animal feed composition is discharged into a mold to form a feed block.

3. A process as in claim 1, wherein the homogeneous animal feed composition is discharged into a compactor to form pellets.

4. A process as in claim 3, wherein the solid ingredients comprise a granular animal feed.

5. A process as in claim 1, wherein the ratio of calcium oxide to molasses is from about 1:4 to about 1:10.

6. A process as in claim 1, wherein the ratio of calcium oxide to molasses is from about 1:8 to about 1:22.

7. A process as in claim 1, wherein the ratio of calcium oxide to molasses is from about 1:2 to about 1:12.

8. A process as in claim 1, wherein the mixer is of the auger type.

9. A process as in claim 1, wherein the solid ingredients comprise from about 20 to about 70 weight percent of the hardened animal feed composition.

10. A process as in claim 2, wherein the mold is a container.

11. A process as in claim 1, wherein the mixed ingredients contain a natural protein.

12. A process as in claim 1, wherein the mixed ingredients contain a vitamin.

13. A process as in claim 1, wherein the mixed ingredients contain a medicament.

14. A process as in claim 1, wherein the mixed ingredients contain a mineral selected from the group consisting of calcium phosphate, potassium-magnesium sulfate, magnesium oxide, solium chloride, and iodized sodium chloride.

15. A process as in claim 1, wherein the mixed ingredients contain an additional liquid selected from the group consisting of liquid vitamin E, corn distiller solubles, and lignin sulfonate liquor.

* * * * *